United States Patent [19]

Sharonov et al.

[11] 4,230,477

[45] Oct. 28, 1980

[54] APPARATUS FOR GRANULATING MOLTEN SLAG

[76] Inventors: Mikhail A. Sharonov, ulitsa Tekhnologicheskaya, 3, kv. 19; Lik A. Zainullin, ulitsa Lenina, 101, kv. 54, both of Sverdlovsk; Felix Y. Olginsky, ulitsa Bazhova, 1, kv. 87; Ivan I. Scherbakov, ulitsa Malakhitovaya, 9, kv. 30 both of, Moscow; Serafim V. Kolpakov, ulitsa Ryazanskaya, 3, Lipetsk; Leonid I. Teder, ulitsa admirala Makarova, 17, Lipetsk, all of U.S.S.R.

[21] Appl. No.: 333

[22] Filed: Jan. 2, 1979

[51] Int. Cl.[2] .............................................. C03B 5/22
[52] U.S. Cl. ..................................... 65/141; 210/181; 210/526
[58] Field of Search ............................ 65/141, 19, 20; 210/526, 532 R, 532 S, 181, 187; 34/137

[56] References Cited

U.S. PATENT DOCUMENTS

| | | | |
|---|---|---|---|
| 1,163,605 | 12/1915 | Schol | 65/141 X |
| 2,082,970 | 6/1937 | Overman | 34/137 X |
| 3,025,611 | 3/1962 | Preeman | 34/137 |
| 3,202,285 | 8/1965 | Williams | 210/532 S X |
| 3,298,822 | 1/1967 | Arvay et al. | 65/19 X |
| 3,615,329 | 10/1971 | Jones | 65/141 |

FOREIGN PATENT DOCUMENTS 95003 7/1922 Switzerland .............................. 65/19

*Primary Examiner*—Robert L. Lindsay, Jr.
*Attorney, Agent, or Firm*—Lackenbach, Lilling & Siegel

[57] ABSTRACT

The apparatus is intended for processing partly solidified slags transported in ladles out of smelting shop and also for processing slags directly besides blast furnaces and steel-making units (e.g. converters).

The apparatus comprises a settling bin provided at its inlet with a water-jet granulator. The settling bin incorporates an elevator with perforated buckets for discharging granulated slag. Elevator pulley shafts are located above the level of water in the bin, the head pulley (the furthest from the granulating compartment) is placed higher than the tail pulley (the nearest to the granulating compartment). A drier is provided at the place of discharge of granulated slag from the settling bin.

The settling bin is of a sealed design and is divided by a partition into two compartments, one of which is intended for granulating molten slag, and the other, for discharging granulated slag from the bin by the elevator. A constant level of water in the bin is ensured by an overflow partition.

The drier means is a rotary drum drier whose discharge end is provided with a fan and a rotary feeder for discharging dry granulated slag onto belt conveyors for transportation to consumers.

4 Claims, 1 Drawing Figure

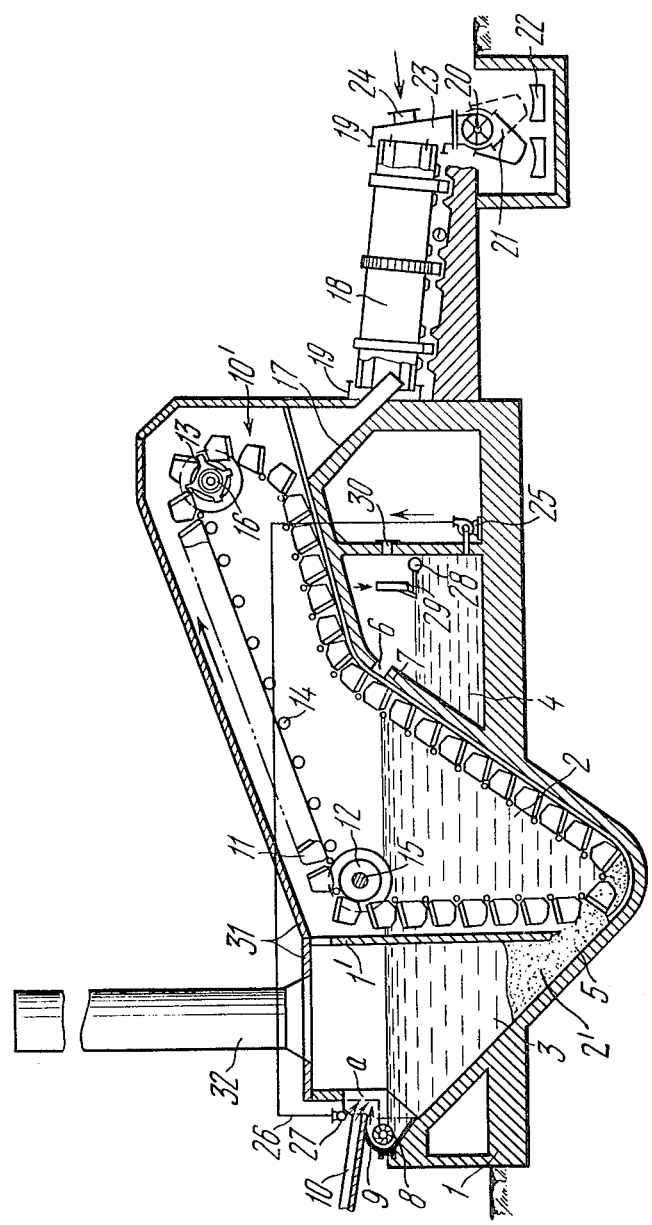

APPARATUS FOR GRANULATING MOLTEN SLAG

BACKGROUND OF THE INVENTION

1. Field of the Invention

This invention relates to an apparatus for processing and handling slag formed in smelting furnaces and units and more especially to an apparatus for granulating molten slag.

This invention may find a most effective application both for processing partly solidified slags transported in ladles out of smelting shops and for processing slags directly by blast furnaces and steelmaking units (e.g. converters).

2. Description of the Prior Art

At present, a wide use is made of installations for granulating slag comprising a water pool, a water-jet apparatus with a launder and an open-air area for the storage of granulated slag (see, for example, USSR inventor's certificate no. 138,518, Int. Cl.CO4b5/02, 1959). Such installations are located at a great distances (up to 1.5 km and more) from smelting plants, and molten slag is transported thereto in ladles carried by locomotives.

Water for granulating molten slag is injected into the launder of the installation, and, at the same time, molten slag is poured thereinto from slag ladles. A resultant slagwater pulp is sprayed upon in an open-air storage area, and after excess water drains off, the slag is piled, and then loaded by grab bucket devices into railway cars for transportation to consumers (e.g. cement works). Drained water flows by gravity into settling basins composed of several sections to ensure more effective clarification.

The disadvantages of slag granulation in such installations are as follows:

high moisture content of granulated slag;

complicated system of recycled water supply (including extensive piping, pumps, fittings, settling basins, etc.), which, due to the tendency of the fine slag particles to cement, requires considerable and other means for frequent repairs required to maintain such system;

risk of explosions when molten iron flows together with slag and/or slag skulls fall into the launder;

need for large open-air storage areas for granulated slag and a water recycling system with settling ponds.

There is known in the prior art an installation for granulating and dewatering slag, located beside a blast furnace (see USSR inventor's certificate no. 529,132, Int. Cl. CO4b5/02, 1971), comprising a closed water-jet granulator with a launder and a pulp-receiving bin with an overflow device located at the launder's outlet. The bin is connected by means of an airlift with a device for dewatering slag, and a receptacle for filtered water with a discharge pipe is provided underneath said device. Underneath the pulp-receiving bin, there is also a clarified water tank communicating in its bottom part with a pump for supplying said clarified water to the water-jet granulator. The pulp-receiving bin is provided with a screen for separating large foreign inclusions and slag skulls.

Molten slag from the blast furnace flows into the launder where it is granulated by jets of water supplied under pressure by pumps from the clarified water tank.

Pulp resulting from granulation enters a pulp-receiving bin where granulated slag settles, whereas clarified water passes over an overflow device into the clarified water tank and is recycled by a pump to the water-jet granulator. Slag settling in the bottom part of the pulp-receiving bin forms with water a thick pulp which is conveyed by an airlift to a dewatering device where filtered water returns via a pipe to a pulp-receiving bin, and whereas dewatered granulated slag is transported by a conveyor to storage or to railway cars. A water vapour-gas mixture formed in the process of granulation is exhausted to the atmosphere.

The disadvantages of slag granulation on such installations are as follows:

necessity for a protective screen in the pulp-receiving bin to prevent the plugging of the airlift by coarse foreign inclusions and slag skulls. These screens tend to be plugged gradually by large slag skulls, by lumps of refractory mass employed to line blast furnace runners and by other objects, with the granulated slag depositing thereon, all contributing to making difficult the servicing of the installation and reducing the time between maintenances and repairs;

relatively large requirements in area make difficult the introduction of said installations in the confined space of existing blast furnace plants. These installations are, as a general rule, built in new blast furnace plants located on new sites where there is usually much more room available.

A prior method closest in technological aspect to the present invention is that disclosed in U.S. Pat. No. 3,615,329, put into effect on an installation comprising a launder for supplying molten slag, a device for granulating and cooling granulated slag formed with a water-jet granulator, complete with launder and pumps, and a coarse slag particle-settling bin (section) which accommodates a vertical elevator with perforated buckets. The bottom part of the elevator is located inside the bottom part of the settling bin. For additionally cooling and cleaning water of fine slag particles, the installation is provided with cyclones and a water cooling system consisting of a cooling tower, a cooling tower basin, pumps and water supply fittings.

Molten slag is supplied along a launder (for example, from a blast furnace) into a water-jet granulator, where the slag is granulated by jets of cold water delivered under pressure by pumps. Pulp then enters the open settling bin where settled granulated slag is transported by the elevator to a handling conveyor. Slag is partly dewatered as it is being transported by the elevator. Hot water clarified in the settling bin and containing fine slag particles in suspension is injected tangentially into hydrocyclones where slag is separated from the water, and then hot water free from fine slag is cooled in cooling towers and recycled to the water-jet granulator.

The disadvantages of slag granulation on such installations are as follows:

a very complicated recirculatory water supply system (several groups of pumps, numerous fittings, settling basins, cooling towers with basins, cyclones);

risk of explosions when molten iron flows together with slag and/or slag skulls fall into the launders;

lack of devices for cleaning slag-formed vapors of sulfurous components;

poor dewatering of granulated slag when the water level in the elevator buckets is higher than that of the slag, this being due to fine particles in suspension in the water settling on the coarser slag and impairing water drainage.

SUMMARY OF THE INVENTION

It is therefore an object of the present invention to provide an apparatus which would ensure the processing of partly solidified slags transported in ladles out of the smelting shops and the processing of slag directly besides smelting furnaces (e.g. blast furnaces, converters and others).

Another object of the invention is to provide an apparatus eliminating the risk of explosions during the granulation of slag should molten metal flow together with the slag and/or should slag skulls be carried with the slag.

Still another object of the invention is to provide a compact, small-size apparatus for granulating molten slag.

Yet another object of the invention is to obtain a dry granulated slag.

The above and other objects are attained in an apparatus for granulating molten slag comprising a device for breaking up molten slag by water. The device is located at the inlet to a settling bin which is filled with water to a defined level and which accommodates an elevator with perforated buckets for discharging granulated slag from the settling bin. The shafts of elevator pulleys are placed above water level in the settling bin, the head pulley being arranged above the tail pulley in the direction of the elevator movement, and a device for drying granulated slag is provided at the place of discharge of said granulated slag from the settling bin. This arrangement places the rotating shafts of elevator pulleys (or sprockets) requiring continuous servicing out of the zone of hot aggressive pulp (a mixture of granulated slag and water) which possesses high abrasive properties and tends to cement and makes it possible to effect the first stage of dewatering of slag by tilting buckets and pouring water thereout, and the second stage, by letting water seep out through perforated walls of the buckets during transportation to the place of discharge and by drying granulated slag in a drying device. This substantially enhances the reliability of operation of the apparatus, increases the time between repairs and makes it possible to obtain a practically dry (up to 5–7% moisture) granulated slag.

According to one embodiment of the invention, the settling bin is of a sealed design and is divided into two communicating compartments, of which one is intended for granulating slag, and the other, for discharging granulated slag by an elevator, the second compartment being provided with an overflow partition. This design of the settling bin ensures a constant level of water in the slag-granulating compartment and makes it possible to install in said compartment a paddle wheel with a scroll, said paddle wheel taking up water from the surface and projecting it in a disperse jet upon a stream of molten slag. Sealing of the settling bin and its division into two compartments with a constant level of water in the settling bin makes the process safe as regards explosions and provides for the possibility of cleaning the evolving steam-gas mixture of sulfurous components by additions of alkalis to water in the settling bin. This obviates the need for a complicated system of recirculatory water supply with pumps for delivering water to the water-jet granulator and to combine the transportation of granulated slag with its dewatering, this making the apparatus small in size and compact and considerably simplifying the granulation process. This solution renders it possible to locate the apparatus either alongside an existing or newly built smelting furnace, whatever its capacity, or in any detached area.

To improve economics and simplify granulation, it is advantageous to dry granulated slag in a rotary drum drier, there being located at the discharge end thereof a fan and a rotary feeder mounted at the place of discharge of dry granulated slag.

BRIEF DESCRIPTION OF THE DRAWINGS

The invention will be further described, by way of example only, with reference to the accompanying drawing, wherein the sole FIGURE in the drawing is a longitudinal elevational section of an apparatus for granulating molten slag.

The apparatus of the invention comprises a sealed settling bin 1 divided by wall 1' into a compartment 2 for discharging granulated slag 2' from the settling bin 1, a granulating water pool 3 and a chamber 4 for adjusting the level of water in the settling bin 1. The compartment 2 communicates with the granulating pool 3 via an inclined duct 5 and with the chamber 4 via a duct 6 and an overflow partition 7. The granulating pool 3 and the chamber 4 may be located by the two other sides of the compartment 2. The pool 3 accommodates a water-jet granulator formed with a paddle wheel 8 with paddle ends curved in the direction of rotation. The paddle wheel 8 is enclosed over an arc of 180°–200° in a scroll 9, a launder for supplying molten slag 10 being located over said scroll 9. The compartment 2 accommodates a sloped elevator 10' consisting of perforated buckets 11, tail pulley 12, head driving pulley-sprocket 13 and rollers 14. Shafts 15, 16 of the pulleys 12 and 13 are located above the water level, determined by the overflow partition 7, in order to enhance the reliability of operation of bearings of the shafts 15, 16 and to improve the conditions for dewatering granulated slag 2' as it is being discharged. In the tail end of the settling bin 1, the compartment 2 changes, above water level, to a chute 17 for gravity charging the granulated slag 2' into a drying device comprising a rotary drum drier 18 connected by seal 19 to the compartment 2 and with the rotary feeder 20 provided with a means 21 for channeling the stream of a now dry granulated slag 2' to either of two belt conveyors 22 for transporting the dry granulated slag to consumers (or to storage). A tail chamber 23 is fitted with a pipe 24 for supplying air from a fan (not shown) for cooling and drying the granulated slag 2'. The chamber 4 communicates with a top header 27 of the water-jet granulator by means of a pump 25 (or an airlift) and a pipe 26. The chamber 4 houses a water level regulator 28 placed on a pipe 29 for supplying fresh make-up water. A pipe 30 built into one of walls of the chamber 4 makes it possible for an emergency discharge of water from the chamber 4. The granulating pool 3 and the compartment 2 are isolated from the surrounding medium by a hood 31 which incorporates a pipe 32 for an organized removal of evolving water vapor and gases into the atmosphere. To neutralize evolving sulfurous compounds, the apparatus is provided with a system (not shown) for preparing milk of lime and delivering it to the water-jet granulator.

The above apparatus operates as follows.

At start-up, the sealed settling bin 1 is filled with water to a defined level. Before pouring molten slag into bin 1 for granulation, the paddle wheel 8 is started to continuously pick up water from the surface of the granulation pool 3 and project it along the scroll 9 as a disperse jet into a space "a" limited on two sides. To eliminate the formation of lightweight granulated slag and maintain a constant water level in the granulation pool 3, the pump 25 (or the airlift) is energized to deliver water from the chamber 4 along the pipe 26 to the top header 27. Excess water flows over from the pool 3 through the duct 6 and the partition 7 into the chamber 4. Loss of water as vapor and through entrainment by granulated slag are made up with the aid of the regulator 28 by supplying fresh water via the pipe 29. Should the bin 1 become overfilled with water, the excess amount can be discharged into a sewer through a pipe 30.

After the paddle wheel 8, the pump 25, the elevator 10' and the milk-of-lime system are energized, molten slag is poured along the launder 10 into the space "a" where the stream of slag is broken into particles which are cooled until they solidify and fall into the pool 3. There is no evolution of harmful sulfurous compounds in the course of the granulation because of the addition of the milk of lime to the granulating water. Cooled particles of the granulated slag 2' move by gravity through the duct 5 into the compartment 2 where they are scooped by the buckets 11 and removed from water which is heated to a temperature of 85°-—100° C. by the granulated slag. As they go around the pulley 12 on the shaft 15, the buckets 11 are tilted almost horizontally with the effect that all of the water above the layer of the granulated slag 2' is poured over the edge of the bucket 11 back into the compartment 2, this being the first stage of dewatering with the water content in the granulated slag 2' going down to approximately 25%. As the buckets 11 move for 30-40 min. along rollers 14, the granulated slag 2' now having a temperature of 80°-100° C. is further dewatered to 10-12% moisture content through the seepage of water through the slag and the perforations of the buckets 11, subsequent to which the buckets 11 are tipped as they go around the driving pulley 13 set on the shaft 16 and the granulated slag 2' slides by gravity along a chute 17 into the rotary drum drier 18. A fan (not shown) supplies air to the rotary drum drier 18 via a pipe 24 in a countercurrent motion to the granulated slag. Air, whose consumption is 60 to 100 kg per ton of the granulated slag at a starting temperature of 80°-100° C., extracts heat from the granulated slag 2' and is saturated with water vapors, this resulting in the granulated slag 2' being cooled to a temperature of 10°-20° C. and dried to a moisture content of 5-7% which is sufficient to prevent said slag from freezing during the cold season. A further lowering of the moisture content of the granulated slag 2' through free percolation and drying at the expense of intrinsic physical heat becomes economically disadvantageous, as it requires a considerable increase in the size of the devices involved (length of the elevator 10') and in the consumption of energy for supplying air. Drying of the granulated slag 2' by burning a fuel, first, is economically disadvantageous, and second, an excessive drop in the moisture content (below 5%) of granulated slag may cause a substantial pollution of the environment by slag dust and would, additionally, require a pre-transportation packing as a very dry granulated slag is capable of trickling through slots in railway car bodies. As the rotary drum drier is sloped, its rotation causes the granulated slag 2' to roll over and to move, counter to the flow of air, toward the tail chamber 23, wherefrom it enters the rotary feeder 20 to be directed with the aid of a means 21 to the corresponding conveyor 22 for transportation to railway cars or to granulated slag storage. Since the system is sealed by means of the hood 31, the seal 19 and the body of the settling bin 1, evolving vapors and gases and waste air from the drier 18 are exhausted via the pipe 32 into the atmosphere.

What is claimed is:

1. An apparatus for granulating molten slag comprising a device for breaking up said molten slag by water, a divided settling bin including inclined walls for holding granulated slag and water connected to said device, a sloped elevator with perforated buckets mounted in said settling bin, at least along one of said inclined walls, for discharging therefrom said granulated slag, pulleys and pulley shafts for said sloped elevator disposed above the level of water in said settling bin, one of said pulleys, being placed above the other one, in the direction of the elevator movement, and a device for drying said granulated slag disposed at the place of discharge of said granulated slag from said settling bin; whereby the reliability of operation is enhanced due to the location of said pulleys and pulley shafts above the level of water in said settling bin.

2. An apparatus as claimed in claim 1, wherein said sloped elevator and said settling bin is sealed to minimize the risk of explosions, and said settling bin is divided into two compartments by means of a partition forming a duct for the granulated slag to move by means of gravity along the other of said inclined walls from a first compartment to a second compartment, said first compartment is intended for granulating molten slag and includes a pool and said other of said inclined walls, and said second compartment includes said pool and said one of said inclined walls for discharging said granulated slag by means of said sloped elevator, and an overflow partition is provided in said second compartment for maintaining the level of water in said settling bin.

3. An apparatus as claimed in claim 1, wherein said device for drying granulated slag is provided with a rotary drum drier, and adjacent the discharge end thereof, there is a rotary feeder and a fan supplying air to said rotary drum drier in a countercurrent motion to that of the granulated slag, the rotary feeder being located in juxtoposition to a chute for the discharge of the dry granulated slag from said sloped elevator.

4. The apparatus according to claim 1, wherein said apparatus has means for tilting said buckets during movement above the level of said water so that generally all the water above the layer of the granulated slag is poured over the edge of the buckets and back into the pool.

* * * * *